United States Patent
Myszka et al.

(10) Patent No.: US 10,427,595 B2
(45) Date of Patent: Oct. 1, 2019

(54) ILLUMINATING VEHICLE ASSEMBLY AND ILLUMINATION METHOD

(71) Applicant: Ford Global Technologies, LLC, Dearborn, MI (US)

(72) Inventors: Joseph Myszka, Livonia, MI (US); Paul Kenneth Dellock, Northville, MI (US); Stuart C. Salter, White Lake, MI (US); David Brian Glickman, Southfield, MI (US); Mehran Niksimaee, Orchard Lake Village, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 170 days.

(21) Appl. No.: 15/601,076

(22) Filed: May 22, 2017

(65) Prior Publication Data

US 2018/0334094 A1    Nov. 22, 2018

(51) Int. Cl.
*B60R 13/00*      (2006.01)
*B60Q 1/50*       (2006.01)

(52) U.S. Cl.
CPC .............. *B60Q 1/50* (2013.01); *B60R 13/005* (2013.01)

(58) Field of Classification Search
CPC .. B60Q 1/503; B60Q 3/60; B60Q 1/50; F21V 5/04
USPC ........................................................ 362/605
See application file for complete search history.

(56) References Cited

U.S. PATENT DOCUMENTS

| | | |
|---|---|---|
| 6,079,860 A | 6/2000 | Ito |
| 7,249,869 B2 | 7/2007 | Takahashi et al. |
| 9,607,534 B2 | 3/2017 | Dellock et al. |
| 2010/0191080 A1 | 8/2010 | Paxton et al. |
| 2012/0182722 A1* | 7/2012 | Wu ........................ B60R 13/005 362/157 |
| 2014/0211506 A1* | 7/2014 | Nakagome ........... G02B 6/0036 362/613 |
| 2016/0221497 A1* | 8/2016 | Schindler .............. B60Q 1/2669 |
| 2016/0274292 A1* | 9/2016 | Shimizu ............ G02F 1/133615 |
| 2017/0036594 A1 | 2/2017 | Roberts et al. |

FOREIGN PATENT DOCUMENTS

EP        1657125        5/2009

* cited by examiner

*Primary Examiner* — Karabi Guharay
(74) *Attorney, Agent, or Firm* — Carlson, Gaskey & Olds, P.C.

(57) ABSTRACT

An exemplary illuminating vehicle assembly includes, among other things, a lens having an outer perimeter, a diffuser beneath the lens, and a light source configured to emit light that passes through the diffuser to illuminate the lens. The light source is disposed outside the outer perimeter. An exemplary illumination method includes, among other things, transmitting light from a light source through a diffuser, and transmitting light from the diffuser through a lens. The light source is outside an outer perimeter of the lens.

17 Claims, 4 Drawing Sheets

ILLUMINATING VEHICLE ASSEMBLY AND ILLUMINATION METHOD

TECHNICAL FIELD

This disclosure relates generally to decorative assemblies for vehicles. In particular, this disclosure relates to a decorative badge, or decorative trim assembly, that is selectively illuminated.

BACKGROUND

Vehicles can include many decorative assemblies. Some decorative assemblies, such as badges, help to identify a model of the vehicle.

Decorative assemblies can be located in many areas of the vehicle, including exterior areas, and interior areas within a passenger compartment. Some vehicles, particularly luxury vehicles, include illuminating decorative assemblies, such as illuminating badges and illuminating trim components.

SUMMARY

An illuminating vehicle assembly according to an exemplary aspect of the present disclosure includes, among other things, a lens having an outer perimeter, a diffuser beneath the lens, and a light source configured to emit light that passes through the diffuser to illuminate the lens. The light source is disposed outside the outer perimeter.

In a further non-limiting embodiment of the foregoing assembly, the lens is multifaceted.

In a further non-limiting embodiment of any of the foregoing assemblies, the lens has a first side and an opposing, second side. The first side faces the diffuser. The second side faces away from the diffuser and includes a plurality of facets.

In a further non-limiting embodiment of any of the foregoing assemblies, the lens and the diffuser are translucent.

In a further non-limiting embodiment of any of the foregoing assemblies, the diffuser includes a plurality of light redirecting features.

In a further non-limiting embodiment of any of the foregoing assemblies, the light redirecting features are depressions that open to a side of the diffuser that faces the lens.

In a further non-limiting embodiment of any of the foregoing assemblies, the diffuser has an outermost perimeter edge. The light source is positioned outside the outermost perimeter edges.

In a further non-limiting embodiment of any of the foregoing assemblies, the diffuser is disposed along a plane. The light source intersects the plane.

A further non-limiting embodiment of any of the foregoing assemblies includes a base. The base provides a cavity that holds the diffuser and the light source.

A further non-limiting embodiment of any of the foregoing assemblies includes an opaque bezel covering a portion of the diffuser that does not interface directly with the lens.

In a further non-limiting embodiment of any of the foregoing assemblies, the light source is a light emitting diode.

An illumination method according to an exemplary aspect of the present disclosure includes, among other things, transmitting light from a light source through a diffuser, and transmitting light from the diffuser through a lens. The light source is outside an outer perimeter of the lens.

A further non-limiting embodiment of the foregoing method includes redirecting light from the light source toward the lens using at least one light redirecting feature within the diffuser.

In a further non-limiting embodiment of any of the foregoing methods, the redirecting comprising redirecting the light 90 degrees.

A further non-limiting embodiment of any of the foregoing methods includes reflecting light using a plurality of facets in the lens.

A further non-limiting embodiment of any of the foregoing methods includes covering a portion of the diffuser with the lens, and covering another portion of the diffuser with an opaque bezel.

In a further non-limiting embodiment of any of the foregoing methods, the light moves through the lens from a first relatively planar side of the lens to an opposite, second side of the lens. The second side has a plurality of facets.

In a further non-limiting embodiment of any of the foregoing methods, the diffuser is disposed along a plane and the light source intersects the plane.

In a further non-limiting embodiment of any of the foregoing methods, the lens is a badge.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Generally, this disclosure relates to an illuminating vehicle assembly. When the assembly is illuminated, light passes from a light source through a diffuser to a lens. The lens can incorporate multiple facets to reflect light and provide the lens with jewel-like appearance.

Figure 1:
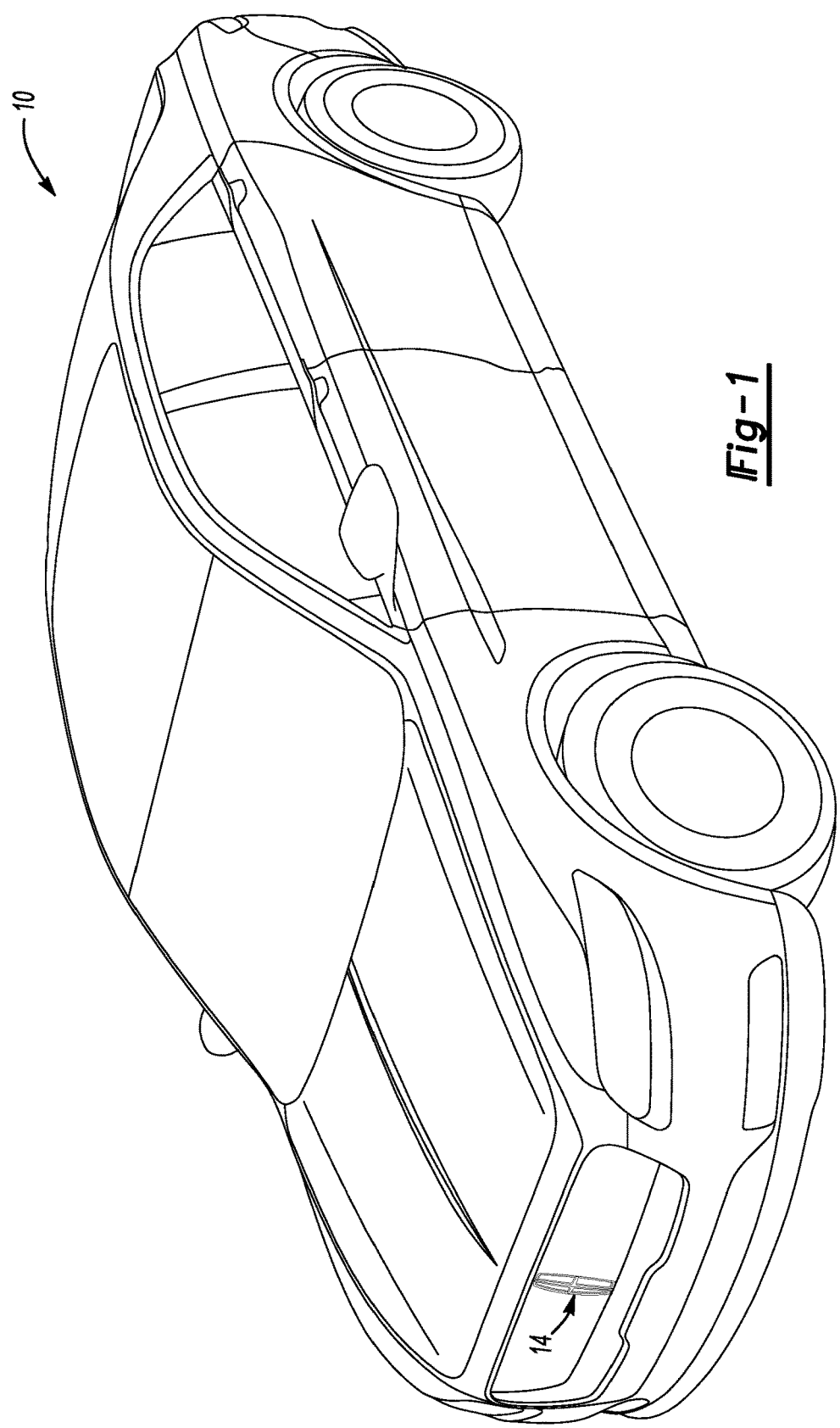
FIG. 1 illustrates a vehicle incorporating an illuminating assembly according to a first exemplary embodiment.

Referring to FIG. 1, a vehicle 10 includes an illuminating assembly 14. In this exemplary non-limiting embodiment, the illuminating assembly 14 is a decorative badge that identifies the vehicle 10. Badges, in contrast to many trim components, can identify a brand of the vehicle 10. The badge can be a logo, symbol, word, or some combination of these.

Although the exemplary illuminating assembly 14 is a badge, the teachings of this disclosure can be applicable to illuminating assemblies that are not badges, such as illuminated trim components.

Further, although the exemplary illuminating assembly 14 is positioned on an exterior front of the vehicle 10, the illuminating assembly 14 could be located elsewhere on the vehicle 10, including areas on the exterior of the vehicle 10 other than the front end, and areas within an interior of the vehicle 10. Other areas of the vehicle 10 suitable for the illuminating assembly 14 can include, but are not limited to, a side panel of the vehicle 10, a deck lid of the vehicle 10, a scuff plate of the vehicle 10, a steering wheel of the vehicle 10, etc.

Figure 2:
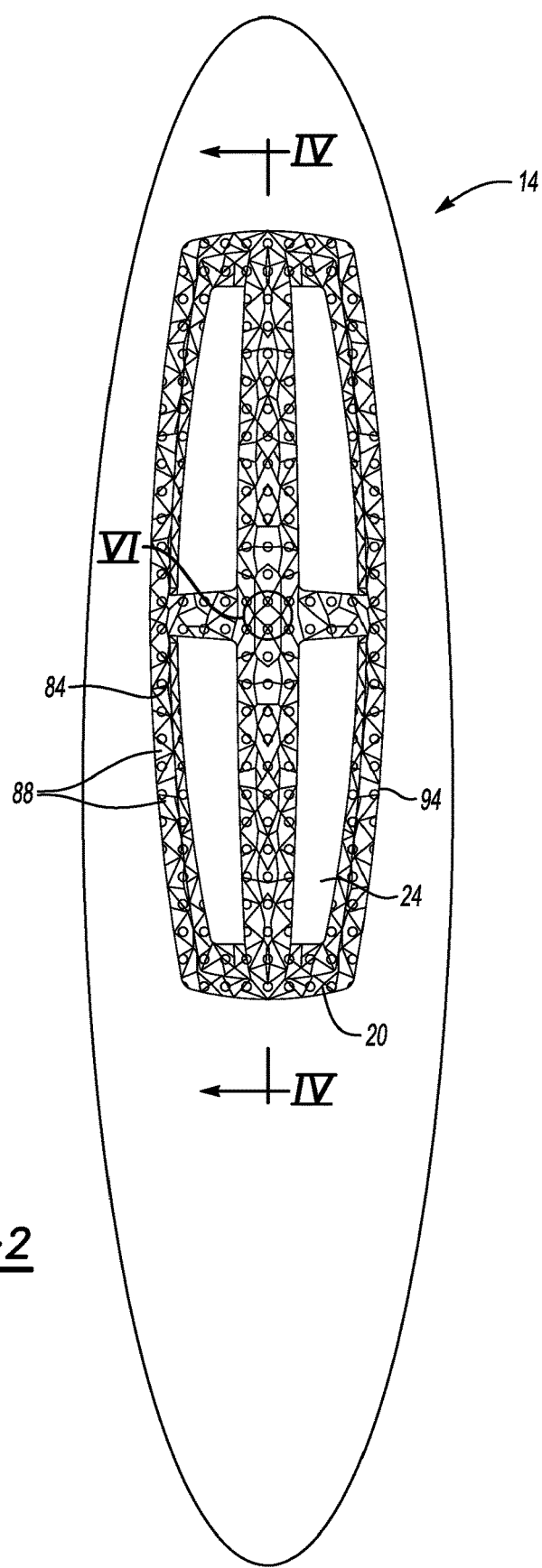
FIG. 2 shows a close-up front view of the illuminating assembly in the vehicle of FIG. 1.
Figure 3:
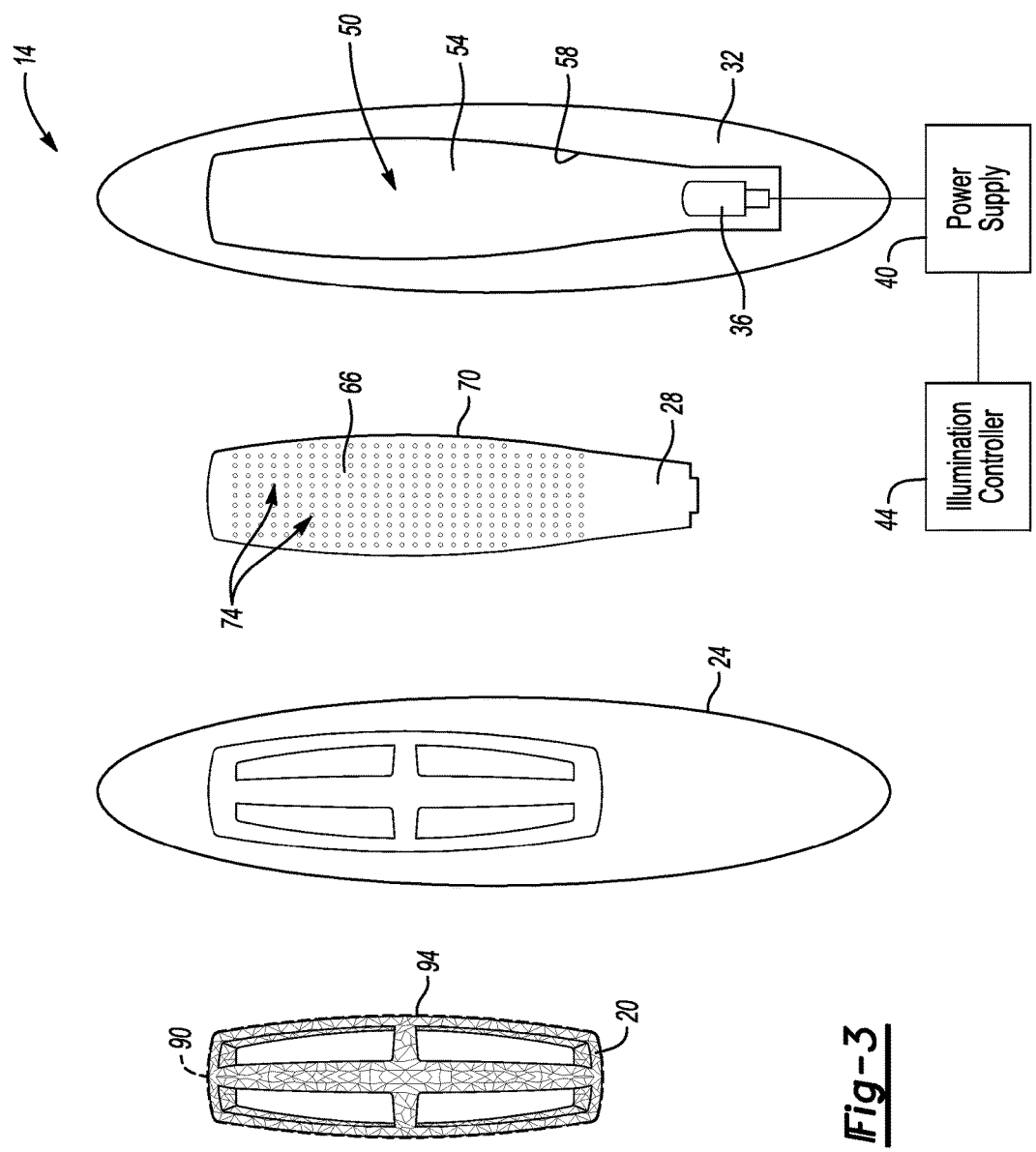
FIG. 3 illustrates an expanded view of the illuminating assembly of FIG. 2.
Figure 4:
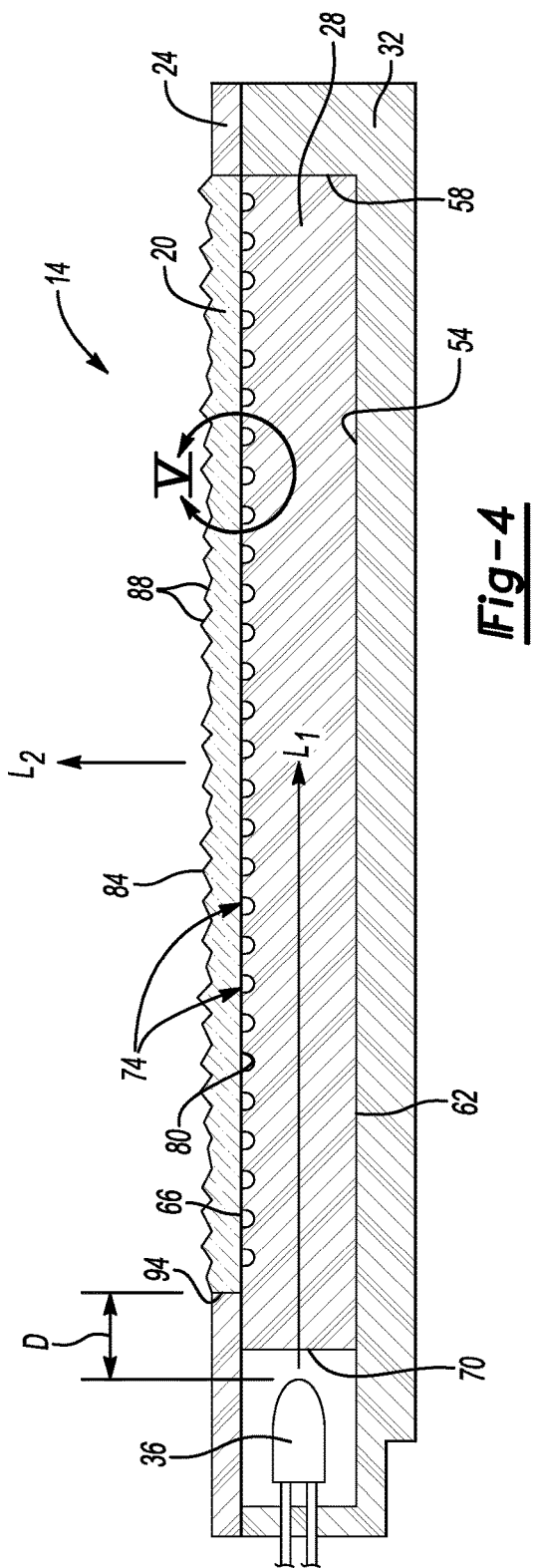
FIG. 4 illustrates a section view at Line IV in FIG. 2.

Referring now to FIGS. 2 to 4 with continuing reference to FIG. 1, the exemplary illuminating assembly 14 includes, in this exemplary non-limiting embodiment, a lens 20, a bezel 24, a diffuser 28, a base 32, and a light source 36.

A power supply 40 can selectively provide power to the light source 36 to cause the light source 36 to emit light. The power supply 40 can be an accessory battery (not shown) of the vehicle 10.

The power supply 40 can power the light source 36 to emit light in response to a command from an illumination controller module 44 of the vehicle 10. In some examples, the controller 44 commands the light source 36 to emit light in an operator input, such as a switch activated by a driver of the vehicle 10. In some examples, the controller 44 commands the light source 36 to emit light in response to a time of day, a level of ambient light around the vehicle 10, or another factor. The controller 44 could, for example, command the light source 36 to emit light when the level of ambient light around the vehicle 10 is below a threshold value. This approach ensures that the light source 36 emits light in low light conditions.

In this example non-limiting embodiment, the light source 36 comprises a single light emitting diode (LED). In other examples, the light source 36 could a plurality of LEDs or other light sources. The light source 36 could be a single-color LED or, if changing a color of light from the light source 36 is desired, a Red, Green, Blue (RGB) LED.

The base 32 provides a cavity 50 having a floor 54 and a plurality of walls 58. The diffuser 28 fits within the cavity 50 along with the light source 36. Within the cavity 50, the light source 36 is disposed at an end of the diffuser 28. The base 32 can be a white, polymer-based material. The base 32 could be molded in other colors in other examples.

In some examples, the base 32 could be tinted with a titanium dioxide to give the base 32 a white color. Tinting to provide other colors could be incorporated in other examples.

The diffuser 28 includes a first surface 62 and an opposing, second surface 66. When the illuminating assembly 14 is assembled as shown in FIGS. 2 and 4, the first surface 62 abuts the floor 54 of the base 32, and the lens 20 and bezel 24 are disposed on the second surface 66. The diffuser 28 further includes sidewalls 70 extending from first surface 62 to the second surface 66.

The diffuser 28 is disposed along a plane generally aligned with the plane of the page in FIG. 3. The light source 36 is positioned within the cavity 50 adjacent the sidewalls 70, such that the light source 36, intersects the plane of the diffuser 28. This can facilitate light passage from the light source 36 to the diffuser 28.

In this exemplary non-limiting embodiment, the diffuser 28 is molded from a polymer-based material, such as diffusion grade acrylics sold under the trademarks ACRYLITE® Satinice or PLEXIGLAS® Diffuse™. Such acrylics are formulated for injection molding applications and are characterized by, among other things, a balance of transmission and hiding performance. Such acrylics can facilitate an even transmission of light across the diffuser 28.

Figure 5:
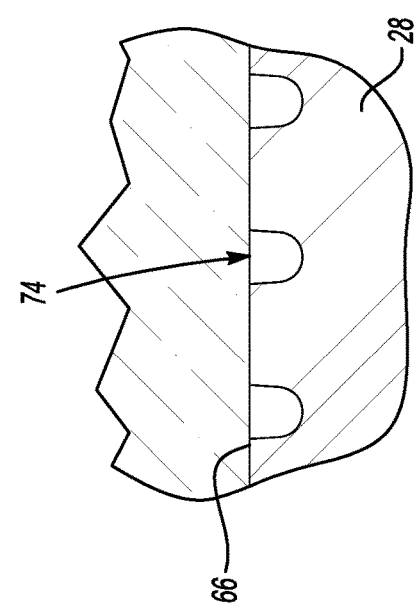
FIG. 5 illustrates a close-up view of Area V in FIG. 4.

A plurality of depressions 74 are distributed across the diffuser 28. The depressions 74 are a type of light redirecting feature. The depressions 74 open to the second surface 66. The depressions 74 are essentially partial bores or openings within the diffuser 28 (see FIG. 5). The diffuser 28 can be molded to include the depressions 74.

In this example, each of the depressions 74 is about 0.1 mm in diameter and about 0.2 mm deep. The precise dimensions of the depressions 74 can be varied to provide a desired lighting effect. Further, the light redirecting features that deflect and redirect light from the diffuser 28 could be something other than depressions 74. For example, the depressions 74 could instead be extensions that extend from the second surface 66 toward the lens 20. The depressions 74 could also be formed in another structure, such as the lens 20.

Light emitted from the light source 36 passes along directly $L_1$ through a sidewall 70 of the diffuser 28 into the diffuser 28. The sidewall 70, in this example, is an outermost perimeter edge of the diffuser 28. The light moves from the diffuser 28 through the second surface 66. The depressions 74 deflect and redirect light moving through the diffuser 28. In this example, the depressions 74 redirect the light 90 degrees so that the light moving through the sidewall 70 moves from the diffuser 28 through the second surface 66 in direction $L_2$. The depressions 74, due to the deflected light, tend to shine as an array of spotlights across the plane of the diffuser 28.

The lens 20 and bezel 24 are positioned atop the base 32 to enclose the diffuser 28 and the light source 36 within the cavity 50. In this example, the lens 20 is translucent and the bezel 24 is opaque. Light from the diffuser 28 is thus blocked by the bezel 24 and moves through the lens 20 to illuminate the illuminating assembly 14.

The bezel 24 ensures that light emitted through the diffuser 28 moves through the lens 20 and does not bleed through other areas of the illuminating assembly 14. In other examples, the bezel 24 could be translucent. In still other examples, the bezel 24 could be omitted. As shown, the bezel 24 is of a multi-piece construction and used to fill in the open areas of the lens 20 to ensure coverage over the diffuser 28. The bezel 24 could be a single-piece construction in other examples. The design of the bezel 24 depends in part on the desired configuration of the lens 20.

The bezel 24, being opaque, hides from view the areas of the illuminating assembly 14 other than the lens 20. The bezel 24 can be molded in color or painted. The bezel 24 can, in some examples, be coated with a chrome or satin nickel finish.

The lens 20 is molded from an optically clear plastic, such as acrylic. Such materials can facilitate resistance to ultraviolet degradation and resistance to scratching another surface damage. In other examples, the lens 20 can be a clarified polypropylene or polycarbonate.

The lens 20 has a first side 80 and an oppositely facing second side 84. When the illuminating assembly 14 is assembled, the first side 80 is positioned adjacent the diffuser 28. In this example, the first side 80 of the lens 20 is positioned against the side 66 of the diffuser 28, which incorporates the depressions 74.

Figure 6:
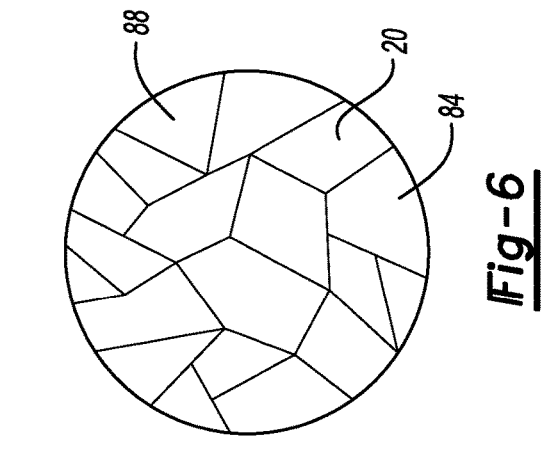
FIG. 6 illustrates a close-up view of Area VI in FIG. 2.

The second side 84 of the lens 20 is a Class A surface. The second side 84 includes a plurality of facets 88 (see FIG. 6). The facets 88 are separate, relatively small planar areas that are slightly offset relative to each other. The facets 88 are a type of diffraction grating that splits and diffracts light emitted from the lens 20 and light that contacts the lens 20 from sources other than the light source 36, such as sunlight. The exemplary facets 88 cause the lens 20 to sparkle to provide a jewel like appearance. The facets 88 can add brilliance to the lens 20 by reflecting light in different directions and by splitting up the colors within the light, when the light is white, to give the lens 20 a diamond-like appearance. In some examples, the lens 20 has a diffraction index that is higher than 2.5 such that the lens 20 relatively efficiently scatters light.

The lens 20 can be molded to include the facets 88. In another example, the facets 88 are laser cut into the lens 20 after molding.

The lens 20 has an outermost perimeter 90 that, in this example, is provided by an edge 94 of the lens connecting the first side 80 to the second side 84. In the assembled illuminating assembly 14, the light source 36 is outside the outermost perimeter 90 of the lens 20. In this example, the light source 36 is spaced a distance D from the outermost perimeter 90 of the lens 20.

Positioning the light source 36 outside the outermost perimeter 90 ensures, among other things, that the illuminating assembly 14 will be viewed as having a relatively even distribution of light through the lens 20 when the light source 36 is powered. If the light source 36 were within outermost perimeter 90, the light source 36, when emitting light, could be viewed as a spot of concentrated light when the illuminating assembly 14 is illuminated.

Further, positioning the light source 36 outside the outermost perimeter 90 ensures that the light source 36 cannot be viewed through the lens 20.

More than one light source 36 can be used depending, in part, on the size and shape of the lens 20 that is illuminated.

Features of the disclosed examples include an illuminated assembly that is aesthetically pleasing due to the facets, "spotlights" of concentrated light due to the depressions, or both.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. An illuminating vehicle assembly, comprising:
   a lens having a first side, a second side opposite the first side, and at least one edge connecting the first side to the second side, wherein the first side is spaced a distance from the second side along an axis that extends from the first side to the second side, wherein the at least one edge establishes an outer perimeter of the lens;
   a diffuser beneath the lens, the first side of the lens facing the diffuser, the diffuser including a plurality of light redirecting features, the plurality of light redirecting features comprising depressions within the diffuser, the depressions each opening to a surface of the diffuser that faces the first side of the lens; and
   a light source configured to emit light that passes through the diffuser to illuminate the lens, the light source disposed laterally outside the outer perimeter relative to the axis.

2. The illuminating vehicle assembly of claim 1, wherein the second side of the lens is multifaceted and includes a plurality of planar areas that are offset relative to each other to provide diffraction grating.

3. The illuminating vehicle assembly of claim 1, wherein the lens and the diffuser are translucent.

4. The illuminating vehicle assembly of claim 1, wherein the diffuser is disposed along a plane, and the light source intersects the plane.

5. The illuminating vehicle assembly of claim 1, further comprising a base, the base providing a cavity that holds the diffuser and the light source, the cavity including a floor and a plurality of walls extending from the floor, the first side of the lens adjacent the floor, the at least one edge adjacent one or more of the plurality of walls.

6. The illuminating vehicle assembly of claim 1, further comprising an opaque bezel covering a portion of the diffuser that does not interface directly with the lens, wherein a common surface of the diffuser interfaces directly with both the lens and the opaque bezel.

7. The illuminating vehicle assembly of claim 1, wherein the light source is a light emitting diode.

8. The illuminating vehicle assembly of claim 1, wherein the depressions each provide an open area between the diffuser and the first side of the lens.

9. An illumination method, comprising:
   transmitting light from a light source through a diffuser;
   transmitting light from the diffuser through a first side of a lens, the light exiting through an opposite second side of the lens, the second side of the lens facing away from the first side the lens in a direction, wherein the lens includes outer edges that connect the first side to the second side and provide an outer perimeter of the lens, wherein the light source is laterally outside the outer perimeter of the lens relative to the direction; and
   redirecting light from the light source toward the lens using a plurality of depressions within the diffuser, the plurality of depressions each opening to a surface of the diffuser that faces the first side of the lens.

10. The illumination method of claim 9, wherein the redirecting comprises redirecting light 90 degrees so that light moving through a sidewall of the diffuser moves from the diffuser through the surface of the diffuser that faces the first side of the lens.

11. The illumination method of claim 9, further comprising reflecting light using a plurality of facets in the lens, the plurality of facets including a plurality of planar areas that are offset relative to each other to provide diffraction grating.

12. The illumination method of claim 9, further comprising covering a portion of the diffuser with the lens, and covering another portion of the diffuser with an opaque bezel, wherein a common surface of the diffuser interfaces directly with both the lens and the opaque bezel.

13. The illumination method of claim 9, wherein the diffuser is disposed along a plane and the light source intersects the plane.

14. The illumination method of claim 9, wherein each of the depressions within the plurality of the depressions provides an open area bounded by the diffuser and the first side of the lens.

15. An illuminating vehicle assembly, comprising:
   a base having a cavity with a floor and a plurality of sidewalls extending away from the floor;
   a diffuser disposed within the cavity;
   a lens disposed adjacent the diffuser such that the diffuser is sandwiched between the floor and a first side of the lens, the lens including a second side opposite the first side, the lens further including at least one edge connecting the first side to the second side, the at least one edge providing an outer perimeter of the lens;
   an opaque bezel covering a surface of the diffuser that does not interface directly with the lens; and
   a light source configured to emit light that passes through the diffuser to illuminate the lens, the light source disposed laterally outside the outer perimeter of the lens, wherein the diffuser includes a plurality of depressions that each open to a surface of the diffuser that interfaces with the first side of the lens.

16. The illuminating vehicle assembly of claim 15, wherein the plurality of depressions each provide an open area between the diffuser and the first side of the lens.

17. The illuminating vehicle assembly of claim 15, wherein the diffuser is disposed along a plane, and the light source intersects the plane.

\* \* \* \* \*